United States Patent [19]

Bourgois

[11] Patent Number: 4,525,430

[45] Date of Patent: Jun. 25, 1985

[54] STEEL FIBRE REINFORCED RUBBER ARTICLE

[76] Inventor: Luc Bourgois, Kwadestraat 7, B-8748 Waregem (Desselgem), Belgium

[21] Appl. No.: 577,516

[22] Filed: Feb. 6, 1984

[30] Foreign Application Priority Data

Feb. 25, 1983 [GB] United Kingdom ................. 8305229

[51] Int. Cl.$^3$ ........................ B32B 15/06; B32B 15/00
[52] U.S. Cl. .................................... 428/625; 428/658; 156/117; 156/124; 427/405; 427/406; 152/451
[58] Field of Search ........................... 152/330 R, 359; 156/124, 117; 427/405, 406; 428/615, 625, 658; 524/439, 424

[56] References Cited

U.S. PATENT DOCUMENTS

| | | | |
|---|---|---|---|
| 4,068,041 | 1/1978 | Swarts et al. | 428/625 |
| 4,267,079 | 5/1981 | Davis et al. | 156/124 |
| 4,330,592 | 5/1982 | Tsukamoto et al. | 428/378 |
| 4,446,198 | 5/1984 | Shemenski et al. | 152/359 X |
| 4,452,291 | 6/1984 | Shemenski et al. | 156/124 |

FOREIGN PATENT DOCUMENTS 2456609 12/1980 France .

OTHER PUBLICATIONS

McPherson, A. T., "Electrical Properties of Elastomers and Related Polymers", Rubber Chem. and Technol., 36(5), pp. 1271–1272 (1963).
Chem. Abstracts, 89: 154718q (1978).
Weening, W. E., "Binding von Kautschuk an Stahlcord", Gumni; Asbest, Kunststoffe, 29(11), pp. 749–757 (1976).

Primary Examiner—Joseph L. Schofer
Assistant Examiner—Fred M. Teskin

[57] ABSTRACT

A rubber article, such as a vehicle tire, reinforced with steel filaments in the form of cables, cords or wefts. The corrosion speed of the steel is reduced by using rubber having a specific electrical resistance of at least $5 \times 10^7$ Ohm centimeter.

7 Claims, No Drawings

STEEL FIBRE REINFORCED RUBBER ARTICLE

The invention relates to a steel fibre reinforced rubber article of enhanced resistance to corrosion, in particular to an article of natural or synthehtic rubber, such as a hose, conveyor belt or vehicle tire. The term "fibre" is used herein to include both continuous and discontinuous filaments.

Steel fibre reinforced rubber articles are known in which, in general, the reinforcing fibres are present in the form of cables, cords or wefts of fibres each fibre having a diameter of 0.15 to 0.40 mm and a tensile strength of above 2000 Newton per m$^2$, and being covered with a rubber adherable layer, such as a zinc or brass coating of 0.05 to 0.40 micron thickness, or a coating of a brass-based ternary alloy, e.g. an alloy comprising at least 95% by weight of copper and zinc.

However, damage to the surface of such articles can frequently result in the reinforcing steel fibres being exposed. For example such articles are often damaged by cuts which penetrate the rubber to the reinforcing steel fibres. Water can then penetrate through such cuts to the steel fibres and corrosion of the steel occurs. Moreover, when the reinforcing fibres are in the form of cords, water reaching the cord further penetrates lengthwise along the cord through the cavities inside the cord and produces so called "cut-corrosion".

Attempts have been made to minimize the corrosion of steel reinforcing wires by the use of galvanic protective coatings, but the need for the fibres so coated to be drawable and to be compatible with the surrounding rubber, i.e. to be capable of satisfactorily adhering to the rubber, has raised serious problems for this approach.

In the case of steel cord reinforced articles the approach has recently been adopted of using a cord structure which allows good penetration into the cord of the rubber matrix thereby minimizing the occurrance of cavities within the cord. However with this approach it has been found that corrosive attack at the interface between the cord and the rubber matrix may progress rapidly lengthwise from the place where water reaches the cord.

It is an object of the present invention to reduce the corrosion occasioned by water or other liquid reaching the steel reinforcing fibres through a cut or break in the rubber matrix.

We have now surprisingly found that where the rubber matrix has a specific electrical resistance of at least $5 \times 10^7$ Ohm centimeter, such corrosion is reduced.

According to the invention we thus provide an article comprised of rubber reinforced by one or more steel fibres wherein the rubber that is in contact with the said fibres has a specific electrical resistance of at least $5 \times 10^7$ Ohm centimeter, preferably at least $10^9$ Ohm cm.

Below the value of $5 \times 10^7$ Ohm centimeter, that is to say in the range of specific resistance of conventional steel wire adherent rubbers, the rate of corrosion of steel fibres within the rubber matrix appears to depend on a number of unknown factors, making it difficult to predict. But above this value, these factors appear to have a very small effect as compared with the effect of the high resistivity whic strongly retards the corrosion.

Whilst the invention is not restricted by any theoretical explanation of its working, it is believed that such explanation may lie in the electrochemical character of the corrosion reaction. According to this explanation, as long as the electrons, liberated i.a. by the reaction $Fe \rightarrow Fe^{++} + 2e^-$, can be removed from the steel through the rubber, the whole chain of reactions which result in the corrosion to i.a. $Fe(OH)_2$ and are dependant on a number of factors can continue; however when these electrons are prevented from leaving the steel, its potential becomes sufficiently negative to decrease or stop the release of further positive Fe-ions into the corroding water and the other factors affecting the corrosion rate become of decreased or no importance.

At least a portion of the steel fibres may optionally be present in the articles of the invention in the form of cords or cables. Furthermore the fibres, whether individual or in cords or cables may be woven or otherwise aligned to form a mat, mesh or web within the article.

Penetration of water into the rubber matrix may in the long run reduce the overall specific resistance of the rubber, and for that reason it is preferable to use a rubber with as low a permeability as possible. It is also preferable to use a lamellar particulate filler such as graphite or carbon black.

To ensure that corroding water is not made acid by contact with the rubber it is preferable that the rubber has a degree of alkalinity of at least 7 and preferably at least 8.

By the term "degree of alkalinity" used herein in respect of rubber is meant the pH of the solution obtained by the following operation: 10 grams of a granulate of average diameter 0.52 mm of the rubber (dispersion $\sigma$ of diameter distribution=0.36 mm) are introduced into a 500 milliliter aqueous solution of 4.5% NaCl (i.e. 45 g NaCl per 1 kg water) (pH=6.39). After boiling the mixture for 24 hours, the pH of the solution is measured.

The degree of alkalinity of a rubber can be varied by the use of fillers and additives. Thus for example if a high degree of alkalinity rubber is desired a carbon black filler having a high pH above 7 may be used and the use of certain cobalt salts, such as cobalt abietate, in the rubber to improve adhesion might be avoided.

The following Examples are provided to illustrate the invention without serving to restrict the scope of protection sought therefor.

EXAMPLES

A conventional steel wire as used in reinforcing steel cord was taken. The wire had a carbon content of 0.75%, a diameter of 0.25 mm and, to enhance its adhesion to rubber, coating of 0.12 micron thickness of (68% Cu-32% Zn) brass.

Around this wire, a thick layer of rubber was vulcanized so as to form a thick rubber embedded wire with a circular cross-section of 3 millimeter diameter and with the reinforcing wire running lengthwise in the centre. The rubber embedded wire was chopped into short lengths of 10 millimeter so as to obtain a number of small cylinders of 10 mm height and 3 millimeter thickness. The wire in each such cylinder was thus covered with rubber except at each cut end where the wire cross-section was exposed to external corrosive influences.

To determine the "corrosion speed" 25 such cylindrical pieces were placed in a 5% NaCl solution (i.e. 50 g NaCl per 1 kg water) at 35° C. for 22 hours. After that time, the concentration of Fe-ions in the solution was measured. From the measured Fe-ion concentration the depth of corrosion in microns of the cut ends of the cylinders was calculated and this depth is termed the corrosion speed. For each rubber composition three separate measurements of corrosion speed were made and the average was taken.

The specific electric resistance of each rubber was measured using a circular disc of the rubber 25 millimeters in diameter and 4 millimeters in thickness placed between two gold plated disc electrodes. The electrodes were placed one below and one on top of the rubber disc, with a contact pressure of 20 Newton/cm². The upper electrode has a diameter of 20 millimeters and the lower electrode had a diameter larger than the diameter of the rubber disc. The resistance between both electrodes was measured at a current of 100 nanoamps and the specific resistance calculated from the measured resistance.

In fourteen Examples different rubber compositions were used and the measured specific resistance of the rubber, corrosion speed, and degree of alkalinity of the rubber are given in the following Table.

In Examples 1 to 5 modified rubbers of unknown composition were used.

In Examples 6 to 14 nine different rubber compositions were used. These rubber compositions each had the following basic content:
100 parts by weight of natural rubber
4 parts by weight of coumarone resin
7 parts by weight of zinc oxide
2 parts by weight of stearic acid
1 part by weight of an antioxidant N-1,3 dimethyl-butyl-N'-phenyl-p-phenylenediamine (Santoflex* 13)
0.8 parts by weight of an accelerator N-oxydiethylene-2-benzothiazolesulphenamide (Santocure* MOR)

*(Santoflex and Santocure are Trade Marks).

Besides these basic components each rubber composition contained further components selected from carbon black, silica, resorcinol, hexamethylenetetramine, N-(cyclohexylthio)-phthalamide, sulphur and cobalt salts such as cobalt abietate. The contents of these further components within the rubber compositions used in Examples 6 to 14 are listed in the Table together with the curing time in minutes at a curing temperature Tc of 90° C.

TABLE

| COMPONENTS (PARTS BY WEIGHT) | EXAMPLE | | | | | | |
|---|---|---|---|---|---|---|---|
| | 1 | 2 | 3 | 4 | 5 | 6 | 7 |
| Carbon black N-326 ASTM (Regal* 300) | | | | | | 60 | 60 |
| SiO₂ (Ultrasil* UN3: 87% pure SiO₂, balance water and impurities) | | | | | | | |
| Mixture of 1 part SiO₂ (Ultrasil* UN3) with 1 part Resorcinol | | | | | | | |
| Hexamethylenetetramine (Hexa* K) | | | | | | | |
| N—(cyclohexylthio)-Phthalamide (Santogard* P VI) | | | | | | | |
| Sulphur | | | | | | 3 | 5 |
| Cobalt abietate | | | | | | | |
| Cobalt salt (Manobond* C 16) | | | | | | | |
| Cobalt salt (Manobond* BPS) | | | | | | | |
| Curing time (minutes) at Tc = 90° C. | | | | | | 12.8 | 13.4 |
| SPECIFIC RESISTANCE (Ω cm) | $4.87 \times 10^5$ | $1 \times 10^7$ | $8 \times 10^5$ | $9.35 \times 10^6$ | $5 \times 10^7$ | $8 \times 10^5$ | $6.5 \times 10^5$ |
| CORROSION SPEED (micron) | 130 | 142 | 105 | 88 | 23 | 57 | 60 |
| DEGREE OF ALKALINITY OF THE RUBBER | 8.30 | 7.00 | 7.90 | 7.08 | 7.10 | 7.21 | 6.21 |

| COMPONENTS (PARTS BY WEIGHT) | EXAMPLE | | | | | | |
|---|---|---|---|---|---|---|---|
| | 8 | 9 | 10 | 11 | 12 | 13 | 14 |
| Carbon black N-326 ASTM (Regal* 300) | 45 | 45 | 60 | 60 | 45 | 45 | 55 |
| SiO₂ (Ultrasil* UN3: 87% pure SiO₂, balance water and impurities) | 12.5 | 12.5 | | | 12.5 | 12.5 | 12.5 |
| Mixture of 1 part SiO₂ (Ultrasil* UN3) with 1 part Resorcinol | 5 | 5 | | | 5 | 5 | |
| Hexamethylenetetramine (Hexa* K) | 1.5 | 1.5 | | | 1.5 | 1.5 | |
| N—(cyclohexylthio)-Phthalamide (Santogard* P VI) | 0.5 | 0.5 | | | 0.5 | 0.5 | 0.5 |
| Sulphur | 3 | 5 | 5 | 5 | 5 | 5 | 3 |
| Cobalt abietate | | | 3 | | 3 | | |
| Cobalt salt (Manobond* C 16) | | | | 1.7 | | 1.7 | |
| Cobalt salt (Manobond* BPS) | | | | | | | 2 |
| Curing time (minutes) at Tc = 90° C. | 21.8 | 30.6 | 13.7 | 13.7 | 21.6 | 21.6 | 22.8 |
| SPECIFIC RESISTANCE (Ω cm) | $3.5 \times 10^9$ | $1 \times 10^{10}$ | $1.49 \times 10^4$ | $4 \times 10^5$ | $1.13 \times 10^{10}$ | $5 \times 10^9$ | $1.5 \times 10^6$ |
| CORROSION SPEED (micron) | 12 | 9 | 174 | 45 | 23 | 16 | 30 |
| DEGREE OF ALKALINITY OF THE RUBBER | — | — | 6.9 | 6.96 | — | — | — |

(*Ultrasil, Regal, Hexa, Santogard and Manobond are Trade Marks)

From the Examples it may be seen that where the specific resistance of the rubber is below $5 \times 10^7$ Ohm centimeter although it is not inevitable there is a serious risk that the corrosion rate will be high. However where the specific resistance is above $5 \times 10^7$ Ohm cm the corrosion rate is low.

It has been observed that where the reinforcing steel fibres rather than being brass-coated are galvanized, either electrolytically to 1.9 micron thickness or hot-dip galvanized to 9 micron thickness, the corrosion rate is reduced to less than 2 micron. Hence it is preferred when possible that the steel reinforcing fibres in the articles of the invention be galvanized, especially where the articles are in the form of conveyor belts.

Apart from the rubbers discussed above other rubbers having high specific electrical resistance may be made. Instead of natural rubber, synthetic rubbers such as butyl or neoprene can be used although natural rubber is preferred for its characteristics of adhesion to the steel reinforcing fibres.

For a given rubber, a principal factor which may be exploited to control the specific resistance is the filler content and particle size: where the filler is carbon black the specific resistance increases when the filler content is reduced and when the filler particle size is increased. For sufficient tensile strength of the rubber, a content of carbon black between 0.35 and 0.8 is used. In the Examples above, a carbon black of the ASTM-type N-326 was used, this being a high abrasion furnace type (HAF) of medium particle size. Smaller particle size carbon blacks are those types having in their ASTM-classification a high figure first numeral, e.g. the thermal types of the ASTM-classification N-880 or N-990 whose particle sizes correspond to mean particle diameters of 500 Å to 5000 Å.

I claim:

1. A steel fibre reinforced rubber article, characterized by the fact that the rubber that is in contact with the fibre has a specific electrical resistance of at least B $5 \times 10^7$ Ohm centimeter.

2. A steel fibre reinforced article according to claim 1, characterized by the fact that said rubber has a degree of alkalinity, as herein defined, of at least 7.

3. A steel fibre reinforced article according to anyone of claims 1 or 2, in which the steel fibre is covered with a coating of brass or a ternary alloy on the basis of brass.

4. A steel wire reinforced article according to anyone of claims 1 or 2, in which the steel fibre is covered with a coating of zinc.

5. A steel fibre reinforced article according to claim 3, in the form of a vehicle tire.

6. A steel fibre reinforced article according to claim 4, in the form of a conveyor belt.

7. A steel fibre reinforced article according to anyone of the preceding claims, in which at least a part of the steel fibre is in the form of steel cord filament.

* * * * *